Figure 1:
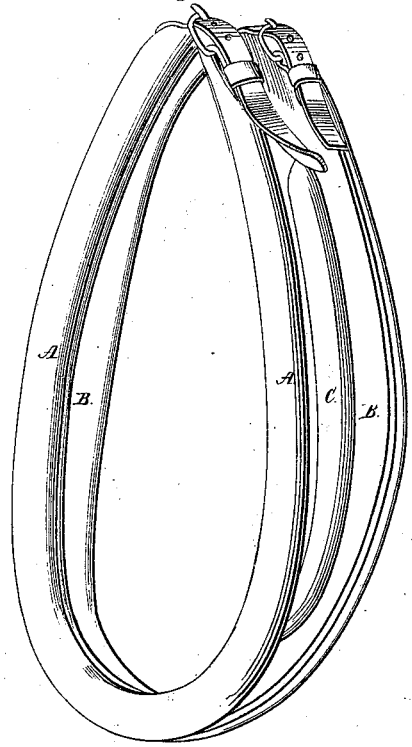
Figure 2:
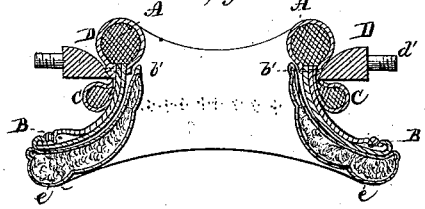

J. H. Van Sice,

Horse Collar,

N° 40,582.    Patented Nov. 10, 1863.

Witnesses:    Inventor:

UNITED STATES PATENT OFFICE.

JAMES H. VAN SICE, OF BUFFALO, NEW YORK.

IMPROVED HORSE-COLLAR.

Specification forming part of Letters Patent No. 40,582, dated November 10, 1863.

*To all whom it may concern:*

Be it known that I, JAMES H. VAN SICE, of the city of Buffalo and State of New York, have invented a new and Improved Horse-Collar; and I do hereby declare that the following is a full and exact description thereof, reference being had to the accompanying drawings, making a part of this specification, in which—

Figure I is a perspective of my improved horse-collar. Fig. II is a transverse section.

The nature of my invention consists in so constructing the collar that that part of it which bears against the horse's breast behind the hames shall be of two or more thicknesses of sole-leather, or equivalent.

Letters of like name and kind refer to like parts in each of the figures.

A represents a stuffed rim, which gives shape and stiffness to the collar, and also serves to hold the hames in their place when the horse is backing.

B represents an elastic pad, which takes the pull of the hame and bears upon the horse's breast. It is composed of two or more thicknesses of sole-leather, sufficient to give strength, elastic spring, and flexibility.

C is a stuffed roll or rib, (one on each side of the collar,) which is strongly sewed to the elastic pad B and to the stuffed rim A. These parts may be put together and stitched through and through, as shown at b', Fig. II. A sufficient distance is left between the roll c and rim A for the hame to lie between them. The pull of the hame is directly upon the roll, and thence to the elastic pad, which bears easily upon the horse's breast or shoulders.

D represents the hame, which is of ordinary construction, having staples d' for the tugs to hook into and ordinary eyes for the lines to pass through.

e represents a soft stuffed pad, which is entirely separate from the collar, and is only designed to be used temporarily when the horse's breast has become very sore and tender from using the old kind of hard stuffed collars. When it is used, it may be put under the collar, as shown in Fig. II.

Advantages: The common hard-stuffed collar, when used on draft-horses, is liable, on account of its hard, rigid, and non-elastic construction, to chafe and irritate the horse's shoulders, insomuch as to injure the horses and render them unfit for use. My improved collar is so elastic that it sets easily upon the horse's breast or shoulders, conforming itself to the varying positions of the shoulders as the horse is traveling, allowing the air to circulate under and between it and the shoulders, so that the horse's shoulders will not gall, chafe, or get sore while using the collar. It is much more easily worn by the horse, and is more durable than collars of ordinary construction.

What I claim as my invention, and desire to secure by Letters Patent, is—

A horse-collar having an elastic and flexible pad, B, stuffed rim A, and roll c, constructed substantially as described.

JAMES H. VAN SICE.

Witnesses:
E. B. FORBUSH,
W. H. FORBUSH.